M. V. B. LYON, Jr.
COLLAPSIBLE FORM FOR CONCRETE SEWER PIPES.
APPLICATION FILED AUG. 8, 1913.
1,208,593.
Patented Dec. 12, 1916.
2 SHEETS—SHEET 2.
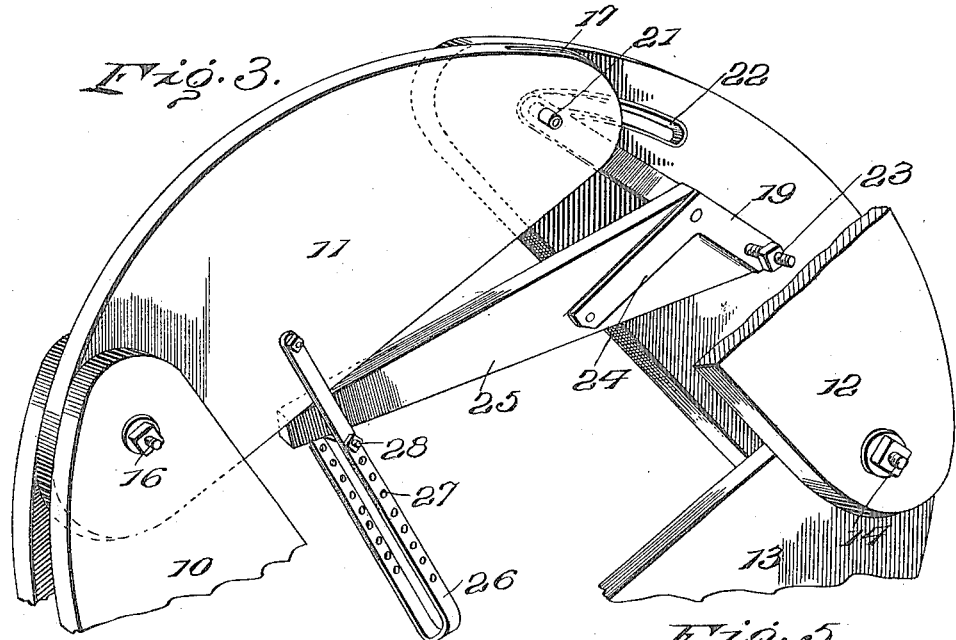
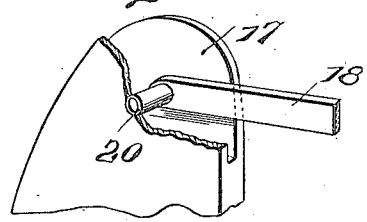
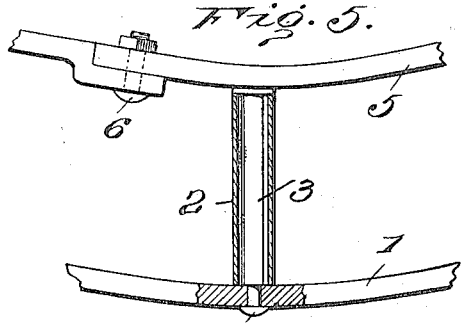
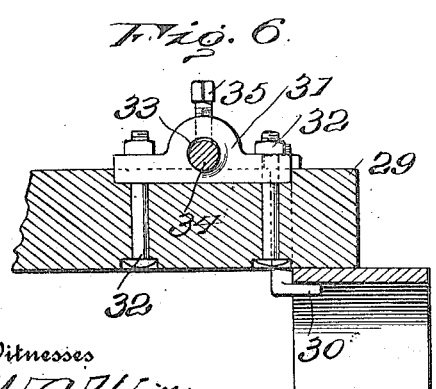
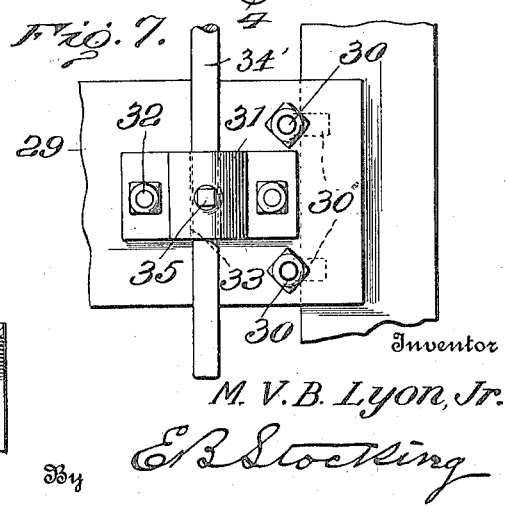
Witnesses
W. A. Williams
Asa P. Bright
Inventor
M. V. B. Lyon, Jr.
By E. B. Stocking
Attorney

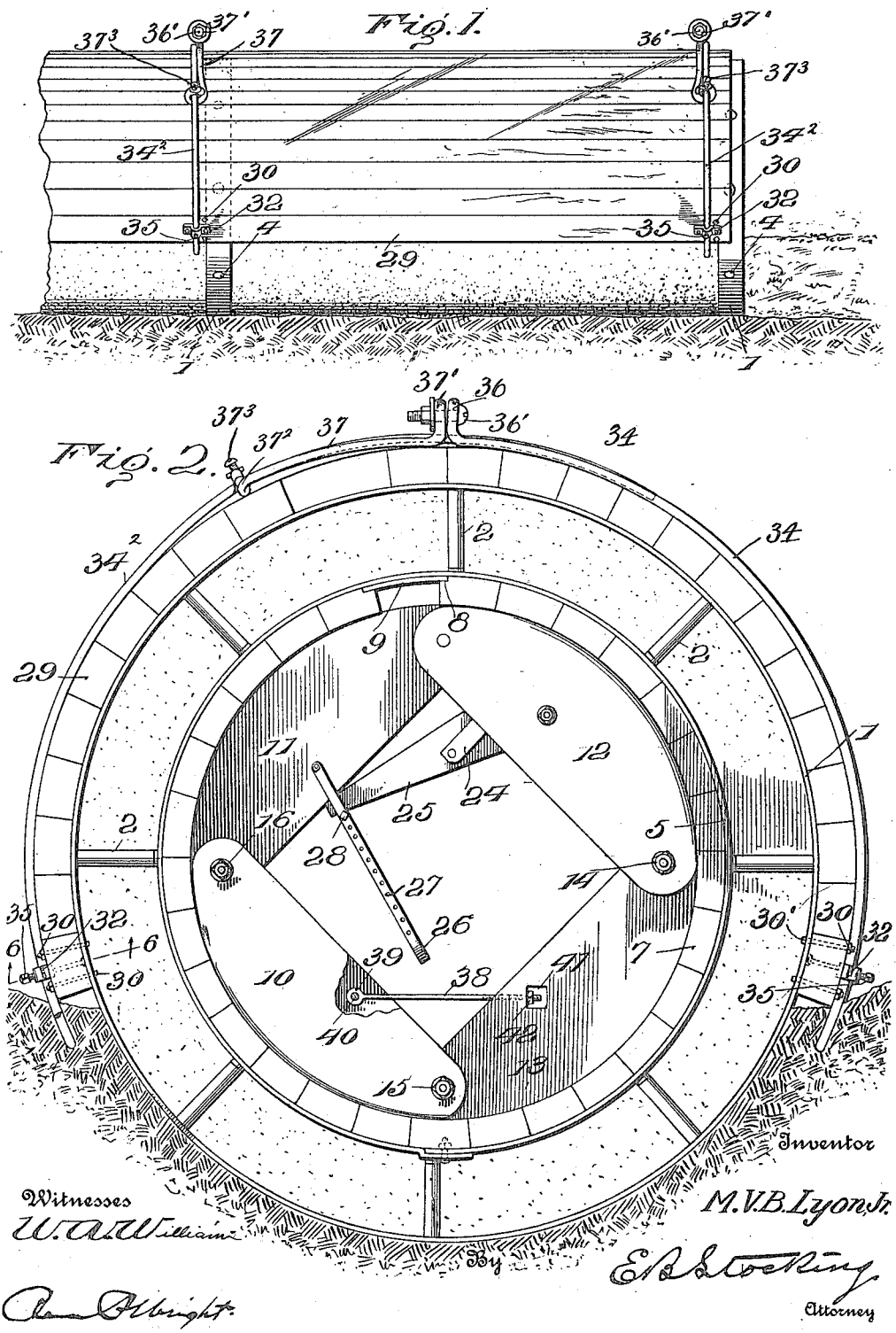

UNITED STATES PATENT OFFICE.

MART V. B. LYON, JR., OF FORT RECOVERY, OHIO, ASSIGNOR OF ONE-HALF TO EMIL WAGNER, OF FORT RECOVERY, OHIO.

COLLAPSIBLE FORM FOR CONCRETE SEWER-PIPES.

1,208,593.  Specification of Letters Patent.  Patented Dec. 12, 1916.

Application filed August 8, 1913. Serial No. 783,754.

*To all whom it may concern:*

Be it known that I, MART V. B. LYON, Jr., a citizen of the United States, residing at Fort Recovery, in the county of Mercer and State of Ohio, have invented certain new and useful Improvements in Collapsible Forms for Concrete Sewer-Pipes, of which the following is a specification, reference being had therein to the accompanying drawing.

This invention relates to certain new and useful improvements in collapsible forms for concrete sewer pipes; the object being to provide a form which is so constructed that the same can be readily set up in position to receive the plastic material in order to mold the pipe, one of the form-supporting members being so mounted that it remains within the plastic pipe formed to form a reinforcing member.

Another object of the invention is to provide a novel form of support for the inner wall of the form which can be readily collapsed in order to allow the inner form to be removed after the plastic material has hardened.

Another object of the invention is to provide a collapsible inner ring for holding the form laggings in position on the support whereby the ring and support can be readily removed.

A further object of the invention is to provide an outer sectional form-holding member which can be clamped securely in position around the outer walls of the sections forming the outer wall of the form.

Another and still further object of the invention is to provide a ring support for the outer form sections having spacing members for holding it the proper distance from the inner ring; said ring being capable of remaining within the plastic pipe formed so as to constitute a reinforcing member for the pipe.

Other and further objects and advantages of the invention will be hereinafter set forth and the novel features thereof defined by the appended claims.

In the above objects, I have set forth a form adapted to be used for forming sewer pipes, but I wish it to be understood that this form is capable of being used for forming any cylindrical conduit, such as a culvert.

In the drawings—Figure 1, is a side elevation of my improved construction of form showing the same in position on the plastic pipe ready to be removed therefrom; Fig. 2, is an end elevation of the form in position on the pipe; Fig. 3, is a perspective of a portion of the collapsible support; Fig. 4, is a detail perspective of one of the members thereof; Fig. 5, is a detail, partly in section, of the inner collapsible ring and the outer ring, showing the spacing means; Fig. 6, is a section taken on the line 6—6 of Fig. 2; and Fig. 7, is a top plan thereof.

Like numerals of reference refer to like parts in the several figures of the drawings.

In carrying out my invention to form a concrete pipe or the like, a trench or ditch is dug where it is desired to form a pipe or culvert and a suitable bed of concrete is placed within the trench upon which the pipe is supported as the same is molded with my improved construction of form, which will be described specifically.

The form comprises a circular ring member 1 which is adapted to remain within the concrete or plastic pipe to form a reinforcing member; said ring being provided with inwardly projecting tubes 2 carried by bolts 3 which are riveted to the ring as shown at 4 at one end and the heads thereof rest upon the inner ends of the tubes and are adapted to engage the inner collapsible ring 5 which is split as shown; one end being offset and overlapping the other end and secured together by a bolt 6, the nut of which is on the inner face of the ring in order to allow the same to be readily unscrewed so as to collapse the inner ring as will be later described.

Arranged annularly around the inner face of the inner ring 5 is a sectional jacket or casing formed of 2"x4"s 7 arranged with their longitudinal edges abutting one another; said jacket forming the inner wall of the form. In order to allow these sections of the jackets to be removed, the jacket is not in the form of a complete circle; one of the sections being omitted and the adjacent edges of the sections adjacent the opening are rabbeted as shown at 8 over which is arranged a metal plate 9 by the removal of which, these sections can be removed as will be later described.

In order to provide means for holding the sections constituting the inner jacket or lagging of the form, I provide a segmental collapsible support composed of segments 10, 11, 12 and 13 which when arranged as shown, form a complete circle to support the sections of the lagging in their proper positions.

The sections 10 and 12 are formed of spaced members and are mounted over the adjacent ends of the sections 11 and 13; the sections 10 and 12 being connected to the section 13 by bolts 14 and 15 in order to allow the sections to swing in respect to each other and the bolt 14 preferably forms a pivot for the section 12 to swing upon. The section 11 is pivotally connected to the section 10 by a bolt 16 and the opposite end of the section 11 is bifurcated as shown at 17 into which extends the arm 18 of a hinge member 19 which is pivotally mounted upon a tubular bearing 20 extending transversely through the section 10; the projecting ends 21 thereof being slidably mounted in metal-cased grooves 22 formed in the inner walls of the section 12 in order to allow the section 11 to move in respect to the section 12 so as to collapse the section of the support as will be later described.

The hinge 19 is mounted on a bolt 23 extending transversely through the members of the section 12 which form the pintle therefor; and the other arm of the hinge 19 extends at an angle therefrom as shown at 24, over a lever 25 which is secured between the arms of the hinge by rivets or bolts as clearly shown; the end of said lever engaging the edge of the section 11 when in its normal position.

In order to provide means for holding the lever in different positions in order to increase or decrease the circumference of the support formed of the sections, I provide the section 11 with a pivoted yoke 26 having registering spaced openings 27 through which a bolt 28 is adapted to pass which bolt engages the lever 25 and holds the same in its adjusted position. In the drawing I have shown the lever clamped against the edge of the section 11 by the bolt 28, but it is of course understood that by adjusting the sections, the support can be increased or diminished in size, so as to snugly fit the inner wall of the jacket or lagging and locked by the lever 25.

In order to form the outer jacket or lagging of the form, I arrange upon the outer ring 1, a number of 2″x4″s forming the sectional jacket 29; the lower 2″x4″ on each side being clamped to the ring 1 by bolts 30 which are provided with laterally extending heads 30′ extending under the edge of the ring 1 so as to securely hold the 2″x4″s in position upon the ring. These 2″x4″s also carry clamping members 31 which are secured in position by bolts 32 and comprise plates having enlarged tubular portions 33 through which the free ends of a sectional clamping ring 34 are adapted to pass and be secured by a set screw 35; said clamping ring being formed of sections; the section 34′ being provided with an eye 36 at one end through which extends a bolt 36′ on which is mounted the eye 37′ of a section 37; said bolt having a nut mounted thereon and a washer for drawing the eyes together for increasing the tension of the clamping ring, as will be later described. The section 37 is provided with a laterally extending eye 37² at its opposite end through which the end portion of the other section 34² extends; said eye carrying a set screw 37³ for locking said section 34² in adjusted position within the eye and it will be seen by this construction, that the length of the clamping ring can be increased or decreased in order to fit different-sized forms and after the free ends thereof have been secured in position within the tubular portion 33 of the clamping members by the set screws 35 by adjusting the section 34² within the eye 37², the eyes 36 and 37′ being slightly spaced apart in order to allow the same to be drawn together by the bolt 36′, the clamping member will be placed under tension in order to securely hold the sectional jacket in its proper position.

The outer jacket does not form a complete circle and at the upper portion thereof, one or more of the 2″x4″s are left out in order that the plastic material may be readily placed between the inner and outer jacket or lagging, so as to form the concrete or plastic pipe.

I have shown and described the sections 10 and 13 connected together by a pivoted bolt 15 but this is not essential in constructing a support for the inner lagging and in order to strengthen this support, I connect the sections 10 and 13 by a bolt 38 forming a brace; said bolt having an eye 39 at one end, which is mounted upon a pin 40 in a recess on the section 10 and extends through a recess formed in the section 13 into an opening 41 formed therein on which is mounted a nut 42 which can be readily manipulated through the opening 41 for adjusting the same in order to hold the sections 10 and 13 in their proper positions in respect to each other. It will be seen by this construction, that the sections 10 and 13 are prevented from moving in respect to each other and while I have shown a brace and bolt for connecting these sections together, it is of course understood that various other means could be employed for connecting the sections rigidly together, without departing from the spirit of my invention.

In setting up a form constructed in accordance with my invention in the form of a plastic pipe or culvert, any number of these supports and rings for the lagging can be used but I have found in practice, that a support and ring spaced from ten to twelve feet will be sufficient to hold the inner and outer lagging firmly and as the concrete is filled in and hardens, the inner ring and support are removed leaving the reinforcing ring and tubes carried thereby, within the wall of the plastic pipe or culvert. The lagging and inner rings and supports are then moved in advance of the previously formed portion of the pipe and the operation is repeated; it of course being understood that it is necessary to provide reinforcing rings for the pipe as the same is constructed. The outer clamping ring for the outer lagging is readily removed by loosening the set screw and the bolts which hold the ring and 2"x4"s in position. By providing the plate for the inner lagging, the sections constituting the same can be moved in respect to each other after the collapsible support has been removed, in order to allow the same to be readily removed from the finished pipe. The bolt on the inner ring is then removed and the inner ring collapsed and detached.

While I have shown and described certain details of specific construction in connection with a form for forming a concrete pipe or conduit, I wish it to be understood that the main object of this invention is to provide a collapsible form in which means is provided for holding the inner and outer lagging concentric to each other to form a plastic wall by the insertion of any suitable kind of plastic material which is reinforced by one of the lagging-supporting rings.

I claim:

1. A collapsible support for a form jacket comprising segments, one pair of segments comprising spaced members between which the other pair of segments are pivotally mounted, means for preventing one pair of segments from moving in respect to the other, a sliding connection between the other pair of segments, a lever, and a yoke for locking said lever for holding said segments in set-up position.

2. A collapsible support for forms, comprising segmental-shaped members pivotally connected together, one pair of segmental members having a sliding connection, adjustable means for holding one pair of members in fixed position in relation to the other pair of members, a lever for moving and holding the other pair of members in set-up position, and a yoke having an adjustable pin for locking said lever in adjusted position.

3. A collapsible support for forms, comprising segmental-shaped members pivotally connected together, one pair of segmental-shaped members having a sliding connection, a lever carried by one of said segmental-shaped members, and a pivoted yoke carried by the adjacent segmental member for locking said lever in adjusted position.

4. A collapsible support for forms, comprising a plurality of segmental-shaped members pivotally connected together, a bolt connecting one pair of segmental members for locking said members in fixed position in respect to each other, a lever carried by one of the other segmental members for moving said segmental members, a yoke carried by one of said segmental members having spaced oppositely disposed openings, and a pin extending through one pair of alining openings for locking said lever in adjusted position.

In testimony whereof I affix my signature in presence of two witnesses.

MART V. B. LYON, Jr.

Witnesses:
F. E. Hoke,
Ed Hoke.

Copies of this patent may be obtained for five cents each, by addressing the "Commissioner of Patents, Washington, D. C."